United States Patent [19]
Ishikawa et al.

[11] Patent Number: 5,389,825
[45] Date of Patent: Feb. 14, 1995

[54] SYSTEM OF CONTROLLING CHANGEOVER OF AN ELECTRIC POWER SOURCE FOR AN ELECTRIC MOTOR VEHICLE

[75] Inventors: Masami Ishikawa; Yukihiro Minezawa, both of Tokyo, Japan

[73] Assignee: Aisin AW Co., Ltd., Japan

[21] Appl. No.: 32,699

[22] Filed: Mar. 17, 1993

Related U.S. Application Data

[63] Continuation of Ser. No. 693,518, Apr. 24, 1991, abandoned.

[51] Int. Cl.⁶ ............................................. B60L 11/06
[52] U.S. Cl. ..................................... 307/10.1; 307/71; 307/120; 307/131; 180/65.8; 318/139
[58] Field of Search ................... 180/65.1, 65.4, 65.8; 290/16, 17, 95, 40 R, 40 A, 40 C; 307/9.1, 10.1, 10.7, 80, 64, 66, 86, 120, 71, 81, 85, 87, 131, 124; 318/139

[56] References Cited

U.S. PATENT DOCUMENTS

| | | | |
|---|---|---|---|
| 3,837,419 | 9/1974 | Nokamura | 290/16 X |
| 3,845,368 | 10/1974 | Elco | 318/139 |
| 3,923,116 | 12/1975 | Thompson et al. | 180/65.8 |
| 4,082,987 | 4/1978 | Cadiou | 318/139 |
| 4,438,342 | 3/1984 | Kenyon | 290/45 |
| 5,225,744 | 7/1993 | Ishikawa et al. | 318/139 |

*Primary Examiner*—A. D. Pellinen
*Assistant Examiner*—Fritz M. Fleming
*Attorney, Agent, or Firm*—Lorusso & Loud

[57] ABSTRACT

A system of changing over an electric power source for an electric motor vehicle including a secondary battery and a generator. The system is provided with a changeover circuit for changing over a state of connection between the secondary battery and the generator; and a controller for determining a power supply mode on the basis of a vehicle speed and an electric current value for driving a motor, the controller being adapted to instruct a changeover to the power supply mode to the switching circuit, thereby allowing high-speed and long-distance running.

5 Claims, 13 Drawing Sheets

|  |  | Tr 1 | Tr 2 | Tr 3 | Tr 4 | Tr 5 | Tr 6 | Tr 7 |
|---|---|---|---|---|---|---|---|---|
| Power Supplying Mode | ① | ○ | × | × | × | × | × | ○ |
|  | ② | × | × | × | △ | △ | △ | ○ |
|  | ③ | × | ○ | ○ | × | × | × | ○ |
|  | ④ | × | × | × | × | × | × | × |
FIG. 3(a)
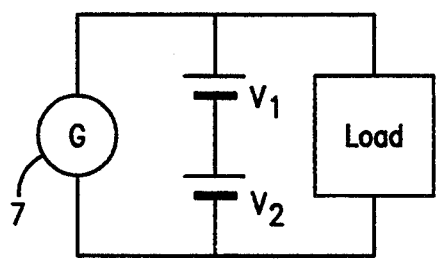
FIG. 3(b)
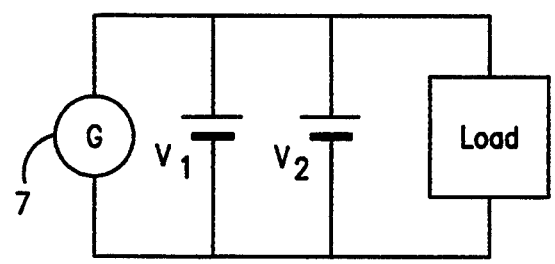
FIG. 3(c)
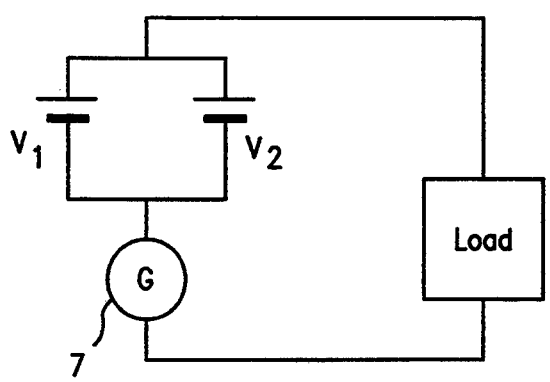
FIG. 3(d)
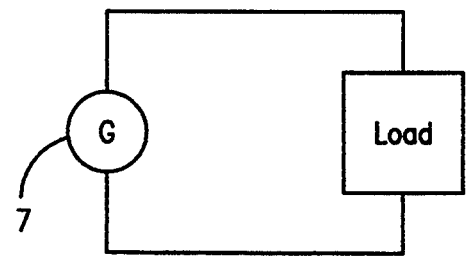
FIG. 3(e)

SYSTEM OF CONTROLLING CHANGEOVER OF AN ELECTRIC POWER SOURCE FOR AN ELECTRIC MOTOR VEHICLE

This application is a continuation of application Ser. No. 07/693,518, filed Apr. 24,1991, now abandoned.

BACKGROUND OF THE INVENTION

1. Field of the Invention

The present invention relates to an electric motor vehicle having a secondary battery and a generator as an electric power source and, more particularly, to a system of controlling the changeover of the electric power source.

2. Description of the Related Art

Conventionally, an electric motor vehicle in which a motor is mounted as a driving power source is known. FIGS. 8A–8C illustrate examples of arrangement of conventional electric motor vehicles. FIG. 8A shows an example in which two motors are arranged in series to drive front or rear wheels. FIG. 8B shows an example in which the front and rear wheels are respectively driven by two separately mounted motors. FIG. 8C shows an example in which the four wheels are respectively driven by four separate motors. In the drawings, reference numerals 51–62 denote wheels; 63–70, motors; and 71–73, differential gears. A hybrid power source device using a secondary battery (hereinafter referred to as the battery) has been proposed as an electric power source device for driving these motors.

A battery has a large power density, and electric power which can be fetched from it at a time is large. Hence, the battery is advantageous in a case where a high torque is required. However, since the energy density of the battery is small, the battery is disadvantageous in long-distance running. Meanwhile, a generator has a large energy density, so that it is advantageous in long-distance running; however, since its power density is small, the generator is disadvantageous in running which requires a high torque. Thus, since the battery and the generator have mutually complementary characteristics, in a hybrid power source device, the burden of the power density can be borne by the battery, and the burden of the energy density by the generator. As a result, the hybrid power source device constitutes a desirable power source device.

However, with a conventional hybrid power source device, the battery and the generator are fixedly connected in parallel or in series, so that there have been the following drawbacks. Namely, in a case where the battery and the generator are connected in parallel, there has been a problem in that electric current supplied to a load becomes low, thereby making high-speed running difficult. Furthermore, since a decline in the remaining amount of the battery causes the voltage to decline, in the case of parallel connection, there has been the problem that current flows from the generator to the battery, thereby making it difficult to obtain an expected driving force. In addition, in a case where the battery and the generator are connected in series, there has been a problem in that it is impossible to cope with a large current required for starting a vehicle or the like, and it is impossible to recharge the battery by making use of the generator in a case where the load is relatively small as during a standstill, thereby making it impossible to effectively utilize the generator.

SUMMARY OF THE INVENTION

Accordingly, an object of the present invention is to provide, in an electric motor vehicle having a hybrid power source device, a system of controlling the changeover of an electric power source for the electric motor vehicle which is capable of controlling the changeover of connection between a battery and a generator into parallel or series, as required, thereby overcoming the above-described drawbacks of the conventional art.

To this end, in accordance with the present invention, there is provided a system of changing over an electric power source for an electric motor vehicle including a secondary battery (10) and a generator (2), comprising: a changeover circuit (9) for changing over a state of connection between the secondary battery (10) and the generator (2); and a controller (1) for determining a power supply mode on the basis of a vehicle speed and an electric current value for driving a motor, the controller being adapted to instruct a changeover to the power supply mode to the switching circuit.

In the present invention, the electric power source device includes the battery (10) and the generator (2), and the changeover circuit (9) for changing over the state of connection between the battery (10) and the generator (2) into parallel or series and the controller (1) are provided. The controller (1) detects a vehicle speed and a load current, and determines an optimum power supply mode in correspondence with a running condition persisting on each occasion by referring to FIGS. 7A to 7F prepared in advance on the basis of the vehicle speed and load current values, thereby to control the changeover of the changeover circuit (9).

Accordingly, in accordance with the present invention, high-speed running is possible since a high voltage can be supplied, and long-distance running is also possible. Furthermore, since the charging of the battery (10) is also possible, it is possible to effect charging if the remaining amount of the battery has declined.

It should be noted that the reference numerals attached to the component parts mentioned above are for the sake of comparison with the accompanying drawings, and the arrangement of the present invention is not to be restricted by the same.

BRIEF DESCRIPTION OF THE DRAWINGS

FIGS. 3A–3E are diagrams illustrating power supplying modes;

DESCRIPTION OF THE PREFERRED EMBODIMENTS

Referring now to the accompanying drawings, a description will be given of the preferred embodiments of the present invention.

Figure 1:
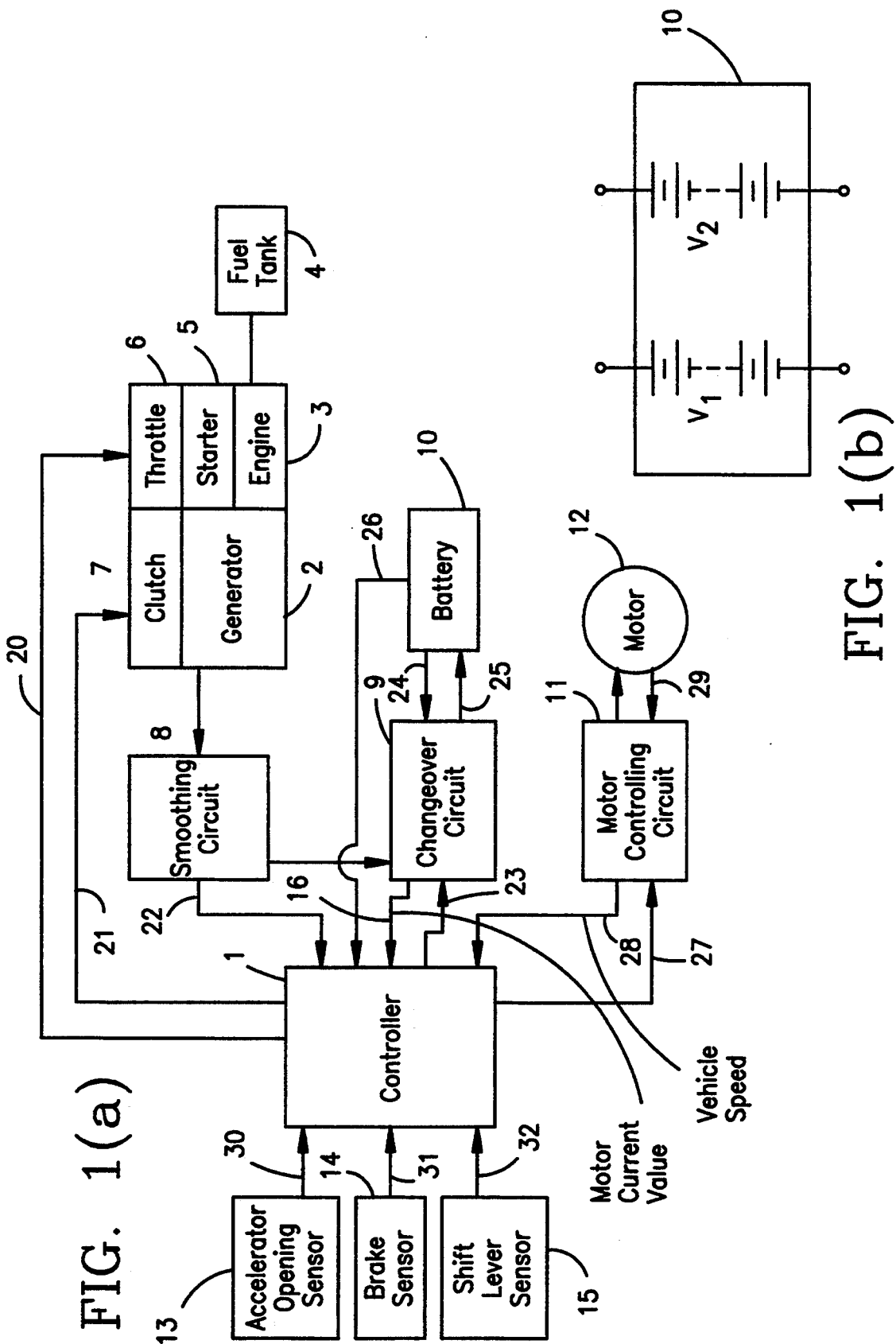
FIG. 1A is a diagram schematically illustrating a configuration of an embodiment of a system of controlling the changeover of an electric power source for an electric motor vehicle in accordance with the present invention.
FIG. 1B is a diagram illustrating a configuration of a battery.

FIGS. 1A is a diagram schematically illustrating a configuration of an embodiment of a system of controlling the changeover of an electric power source for an electric motor vehicle in accordance with the present invention. As shown in the drawing, this system comprises the following components: a controller 1, a generator 2, an engine 3, a fuel tank 4, a starter 5, a throttle 6, a clutch 7, a smoothing circuit 8, a changeover circuit 9, a battery 10, a motor controlling circuit 11, a motor 12, an accelerator opening sensor 13, a brake sensor 14, and a shift lever sensor 15.

In FIG. 1A, the controller 1 constitutes a core of the system of controlling the changeover of an electric power source for an electric motor vehicle in accordance with the present invention and is comprised of an arithmetic unit such as a microprocessor and memory devices such as a RAM and a ROM. The controller 1 is designed to determine a power supplying mode and torque to be imparted to the motor 12 by effecting the processing which will be described later. In addition, the controller 1 is provided with an A/D converter for digitizing analog signals inputted from various sensors so as to effect digital processing.

Figure 2:
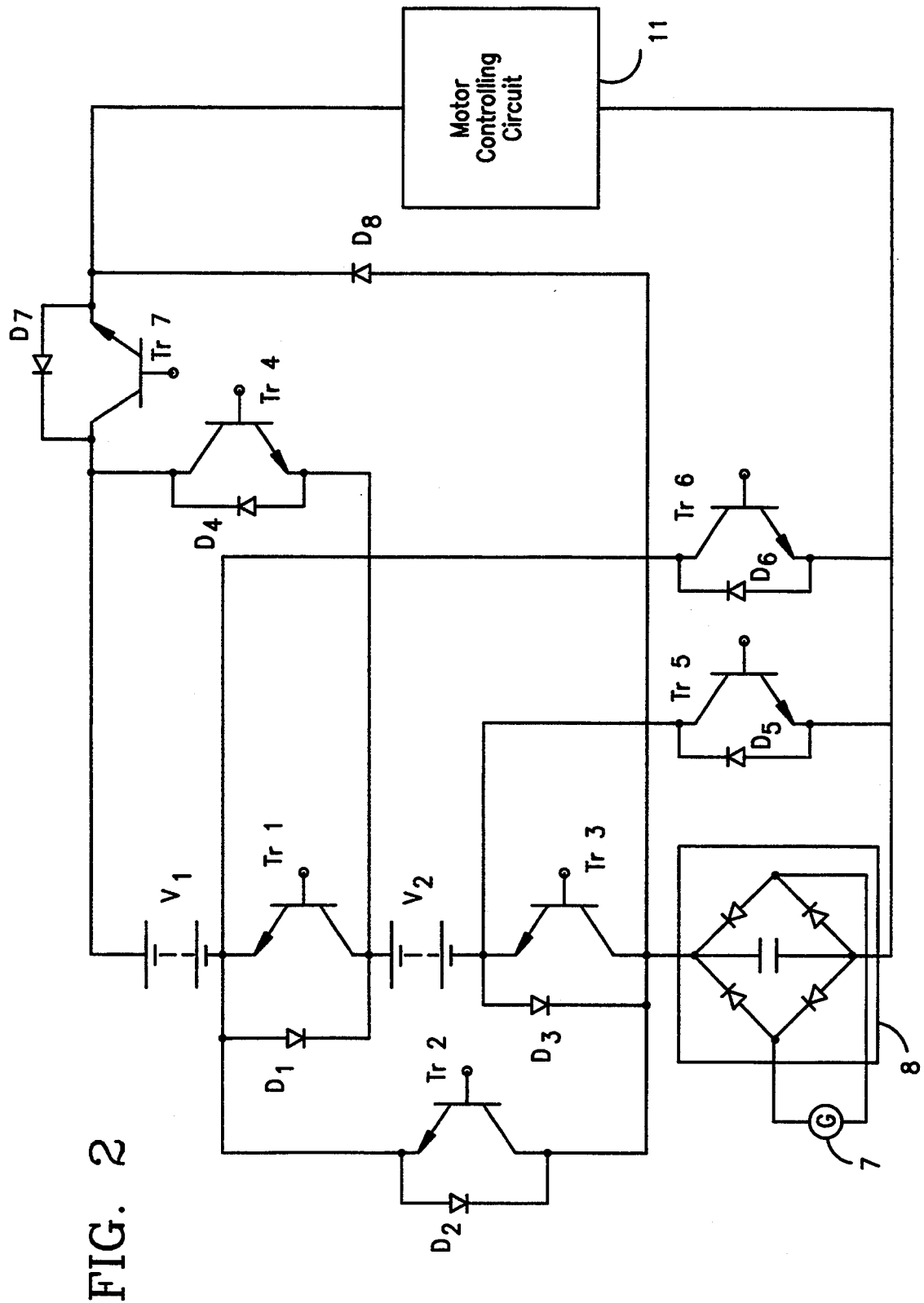
FIG. 2 is a diagram illustrating an example of a configuration of a changeover circuit.

The generator 2 is used to generate an alternating current by means of the engine 3, and the alternating current generated is converted to a direct current by means of the smoothing circuit 8 and led to the changeover circuit 9. The engine 3 uses gasoline or the like as fuel, and the fuel is stored in the fuel tank 4. Accordingly, the greater the capacity of the fuel tank 4, the longer distance the vehicle is capable of running. In addition, the starter 5 is used for starting the engine 3 and is constituted by a motor, and a battery (not shown) for operating the starter 5. The throttle 6 is used to regulate the amount of an air-fuel mixture to be supplied to the engine 3, and its opening is determined by a control signal delivered by the controller 1 via a control line 20, whereby the speed of the engine 3 and, hence, the number of revolutions of the generator 2 are controlled. The clutch 7 is used to transmit or not transmit the rotation of the engine 3 to the generator 2, and whether or not the rotation is to be transmitted is determined by a control signal delivered by the controller 1 via a control line 21. It should be noted that if changeover circuit 9 is arranged as shown in FIG. 2, thanks to the presence of a diode D8 a similar function can be attained by lowering the voltage generated by the generator 2 to a level lower than the voltage of the battery 10, so that the clutch 7 can be omitted. Here, if the battery 10 is comprised of two battery units V1, V2 as shown in FIG. 2, the voltage of the battery 10 is one obtained in a case where the units V1, V2 are connected in parallel or in series.

The smoothing circuit 8 is used to convert the alternating current generated by the generator 2 so as to be led to the changeover circuit 9, and can be arranged with bridge-connecting diodes. In addition, the value of a DC voltage between output terminals of the smoothing circuit 8 and the value of a current flowing to the changeover circuit 9 are inputted to the controller 1 via a signal line 22.

The changeover circuit 9 is used to change over four types of power supplying modes by switching the state of connection between the smoothing circuit 8 and the battery 10 into parallel or series connection. The changeover circuit 9 is arranged with a switching circuit using transistors and diodes, as will be described later. In addition, the value of a current (hereinafter referred to as a load current) flowing from the switching circuit 9 to the motor controlling circuit 11 constituting a load is fetched by the controller 1 via a signal line 16.

The configuration of the battery 10 may be arbitrary, but in the embodiments described below, the battery 10 is configured such as to include two battery units V1, V2, and the battery units V1, V2 are respectively arranged with eight 12 V batteries connected in series, as shown in FIG. 1B. Accordingly, in this case, the rated voltage of each of the battery units V1, V2 is 96 V. It should be noted that, in the drawing, reference numeral 24 denotes the flow of a discharge current from the battery 10, and numeral 25 the flow of a charging current for the same. In addition, the value of a voltage between terminals of each battery unit of the battery 10 and the value of a discharge current are fetched by the controller 1 via a signal line 26.

The motor controlling circuit 11 supplies a predetermined driving current to the motor 12 by using an output of the changeover circuit 9 as an electric power source. How much current is to be supplied to the motor 12 is determined by a command value delivered by the controller 1 via a control line 27. The motor 12 must be rotated forwardly or reversely in order to move the vehicle forwardly or backwardly. For that purpose, a determination must be made as to to which coil of the motor 12 the current must be supplied. Consequently, the motor controlling circuit 11 is arranged such as to detect a position of the magnetic pole of the motor 12 by fetching an output of a resolver (not shown) disposed in the motor 12 via a signal line 29, thereby determining the coil to which the current is being supplied. In addition, the motor controlling circuit 11 delivers vehicle-speed data to the controller 1 via a signal line 28. It should be noted that although the motor controlling circuit 11 is constituted by a switching circuit, a description of the details of its configuration will be omitted since the circuit is a conventionally well-known one.

For the motor 12, it is possible to use one whose configuration is conventionally well known. It should be noted that although only one motor is shown in FIG. 1A, the motor is shown as representing all the motors, and the present invention can naturally be applied to electric motor vehicles using a plurality of motors.

Outputs of the accelerator opening sensor 13, the brake sensor 14, and the shift lever sensor 15 are respectively fetched by the controller 1 via signal lines 30, 31, 32. The accelerator opening sensor 13 detects an amount of an accelerator (not shown) pressed. The brake sensor 14 detects whether or not a brake pedal (not shown) is being pressed. The shift lever sensor 15 determines whether a shift lever is in a forwarding position, in a reversing position, or in a neutral position. As for these sensors, it is possible to use conventionally known ones, respectively.

The changeover circuit 9 may comprise seven transistors Tr1-Tr7 and eight diodes D1-D8, as shown in FIG. 2. The transistors Tr1–Tr7 are connected in parallel with the diodes D1–D7 which absorb back electromotive force occurring at a time when the transistors are switched over. It should be noted that in FIG. 2 reference characters V1, V2 denote battery units of the battery 10.

In this embodiment, the transistors of the changeover circuit 9 are switched over as shown in FIG. 3A so as to establish one of the four types of power supplying modes shown in FIGS. 3B to 3E. In FIG. 3A, a circle (○) indicates that a relevant transistor is set in an "on" state, a cross (×) indicates that a relevant transistor is set in an "off" state, and a triangle (Δ) indicates that a relevant transistor is set in an "on" state during charging and in an "off" state during non-charging. In a case where the transistors Tr1 and Tr7 are on and the remaining transistors are off, the battery units V1, V2 are connected in series as shown in FIG. 3B, and the generator 7 is connected in parallel with the same. This is a first power supplying mode which is suitable for high-speed running. In a second power supplying mode shown in FIG. 3C, the generator 7 and the battery units V1, V2 are connected in parallel, and this power supplying mode is capable of generating high torque. In this power supplying mode, it is possible to effect charging with respect to the battery units V1, V2. During charging, the transistors Tr1–Tr3 are turned off and the transistors Tr4–Tr7 are turned on, and when charging is not effected, only the transistor Tr7 is turned on. In a case where the transistors Tr2, Tr3, Tr7 are on, and the remaining transistors are off, the battery units connected in parallel with the generator 7 are connected in series, as shown in FIG. 3D. This is a third power supplying mode which is suitable for medium-speed, long-distance running. In a fourth power supplying mode, only the generator 7 is used, as shown in FIG. 3E, in which all the transistors are set to off. This fourth power supplying mode is suitable for low-power, long-distance running and is capable of conserving the battery.

Figure 4A:
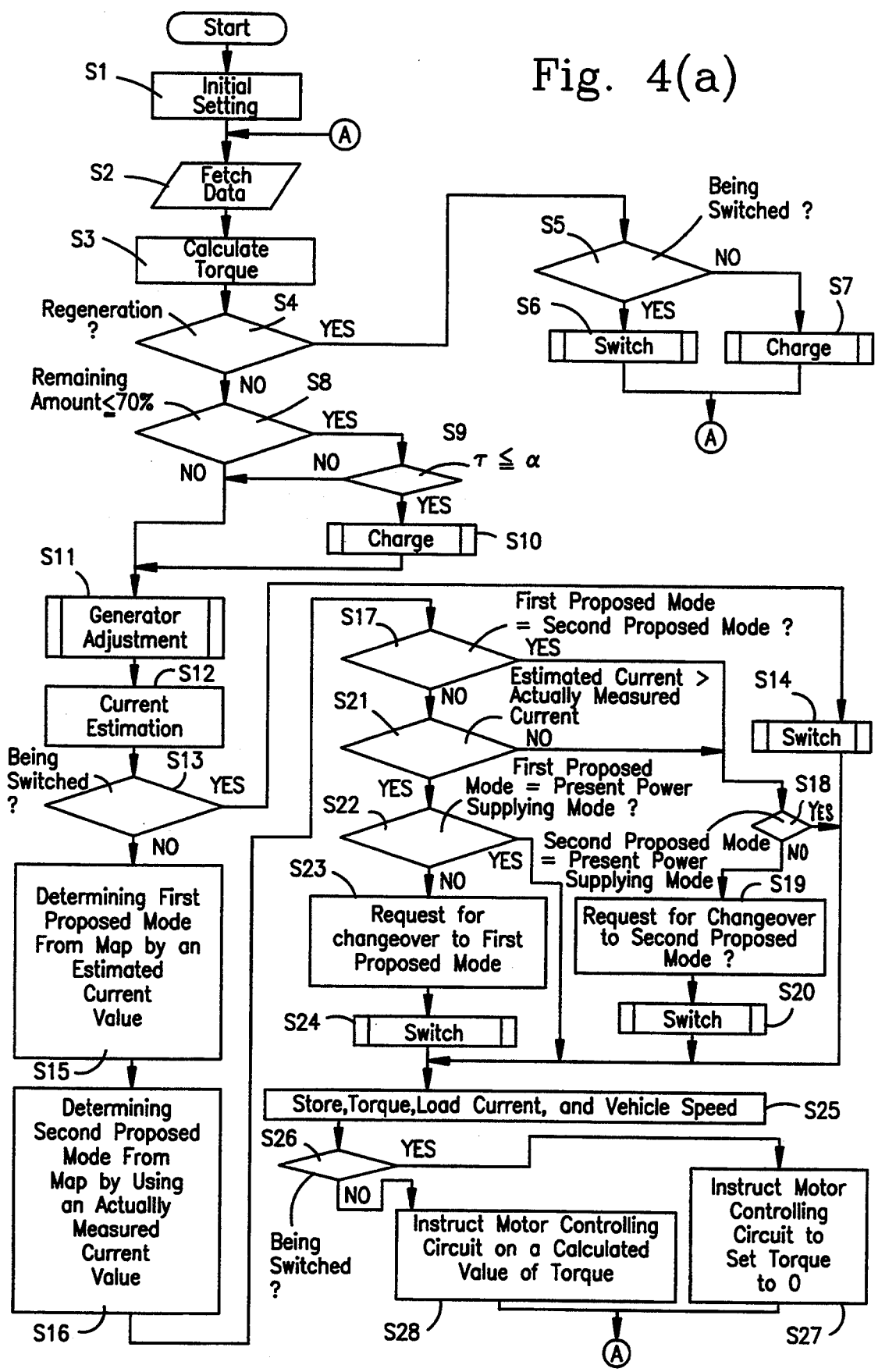
FIGS. 4A–4D are flowcharts illustrating the flow of processing effected by a controller.
Figure 4B:
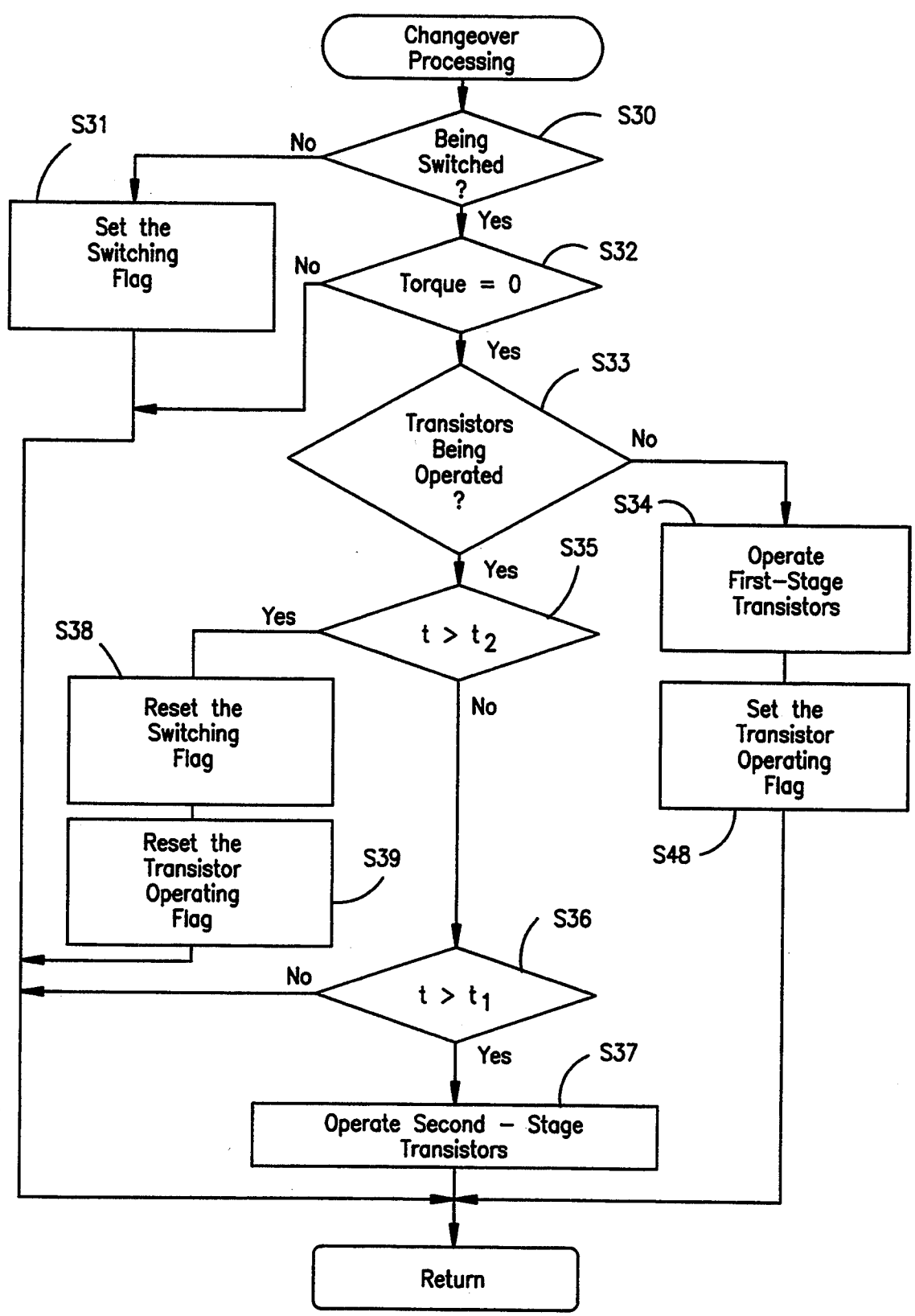
Figure 4C:
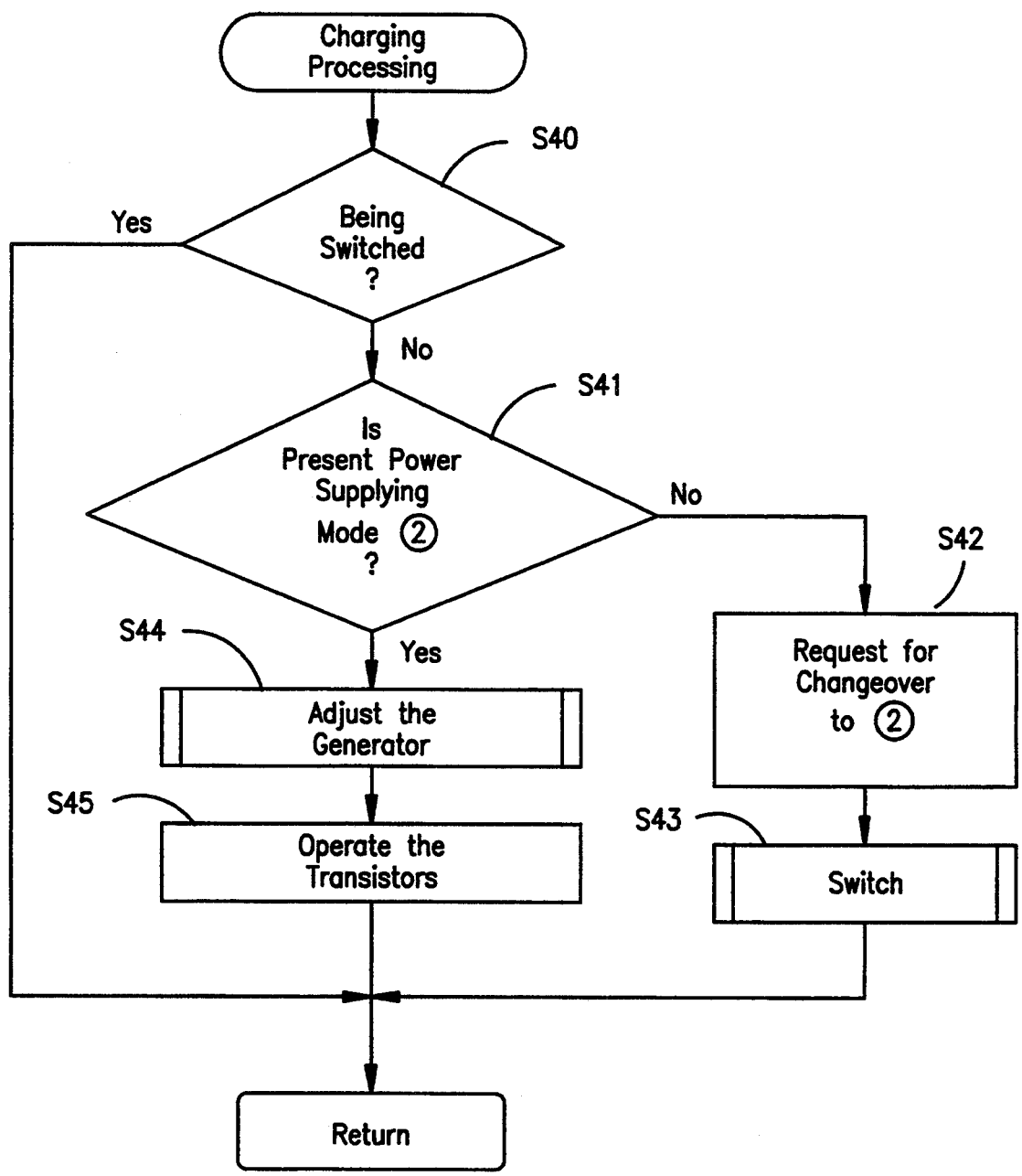
Figure 4D:
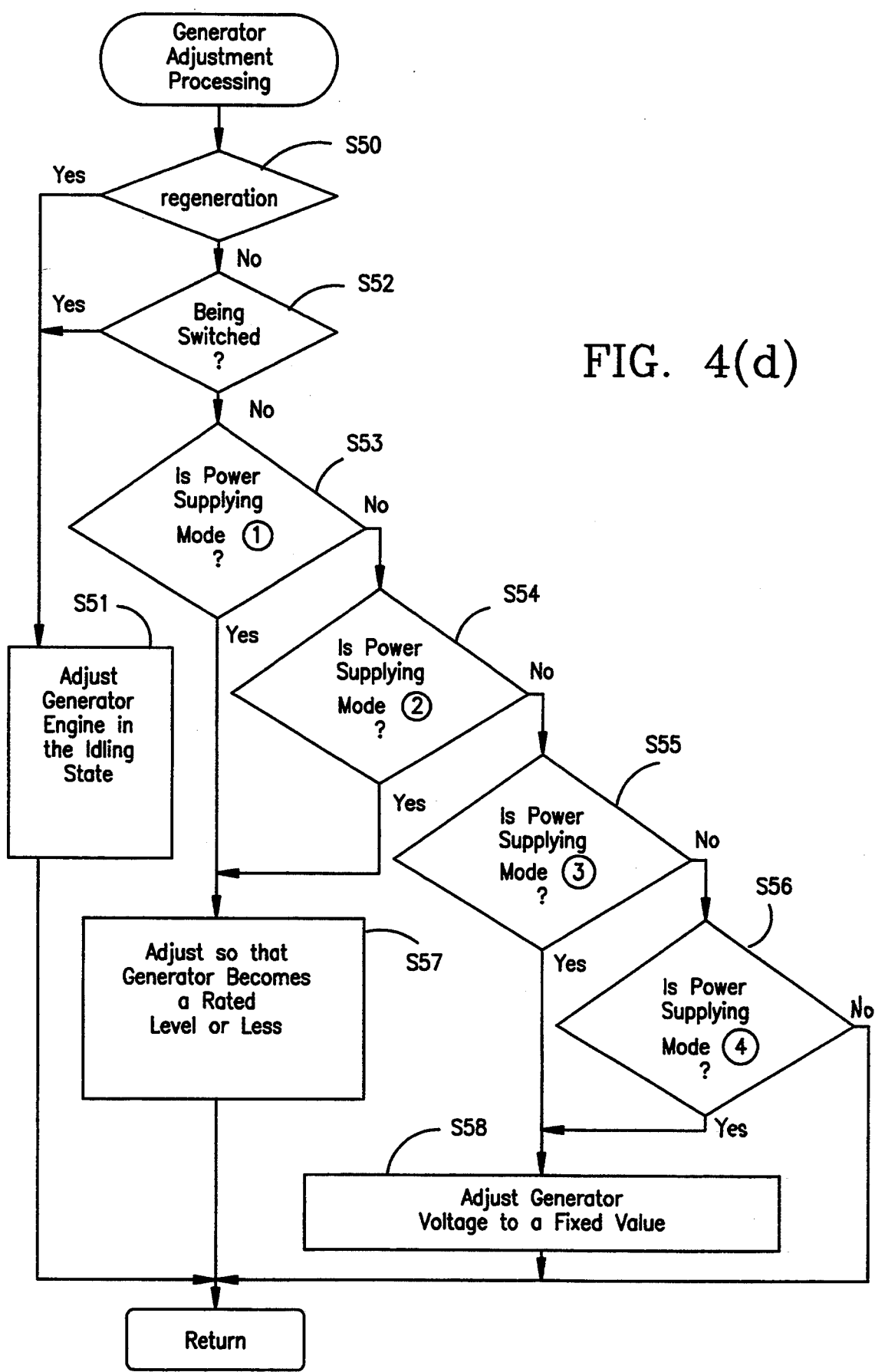

The changeover of the above-described power supplying modes is effected in accordance with instructions given by the controller 1, and a description will now be given of processing effected by the controller 1 with reference to FIGS. 4A–4D. FIG. 4A is a flowchart illustrating the flow of overall processing effected by the controller 1. FIG. 4B is a flowchart illustrating the flow of changeover processing in that processing. FIG. 4C is a flowchart illustrating the flow of charging processing. FIG. 4D is a flowchart illustrating the flow of generator adjustment processing.

When processing is commenced, the initial setting of the microprocessor is first executed, and the second power supplying mode is set as the power supply mode (S1). The controller 1 then fetches various data (S2). That is, the controller 1 fetches a value of dc voltage, i.e., an output, and a current value from the smoothing circuit 8; a load current value from the changeover circuit 9; a value of voltage between terminals and a discharge current value with respect to the battery units V1, V2, respectively, from the battery 10; and a vehicle speed from the motor controlling circuit 11, respectively. The controller 1 further fetches output signals from the accelerator opening sensor 13, the brake sensor 14, and the shift lever sensor 15.

Upon completion of the fetching of the data, the controller 1 calculates torque on the basis of the vehicle speed and the accelerator opening (S3). The calculation of torque can be effected by a known method such as one using a map in which torque values corresponding to the vehicle speed and the accelerator opening have been written.

Then, a determination is made on the basis of the output of the brake sensor 14 as to whether or not regeneration is required (S4). If regeneration is being effected, the battery 10 is recharged by making use of the electric power generated by the motor 12. Before this recharging, however, a determination is made as to whether or not the transistors of the changeover circuit 9 are being switched over. The reason for determining whether or not the changeover circuit 9 is effecting a switching is that since a certain amount of current flows through the changeover circuit 9 during recharging, it is dangerous to effect the on/off switching of the transistors with the current flowing. This determination can be made by detecting whether or not a certain time has elapsed after the controller 1 has instructed the changeover of a power supply mode to the changeover circuit 9. If it is determined in Step S5 that the changeover circuit 9 is effecting switching, the changeover is continued through the changeover processing in Step S6, and if the switching is not being effected, the recharging processing is executed in Step S7 before the processing beginning with Step 25 is carried out.

In the changeover processing, as shown in FIG. 4B, a determination is made as to whether or not switching is being effected, i.e., a switching flag has been set (S30). If the switching flag has not been set, a flag indicating that switching is currently being effected is set, followed by a return (S31). Namely, if a determination is made that switching is not being effected in an ensuing determination concerning switching despite the fact that a determination has been made in Step S5 that switching is being effected, it would be contradictory. For this reason, the determination in Step S5 is given a priority, and it is made clear that switching is being effected by setting the switching flag in Step S31. After the switching flag is set in Step S31, the operation returns to Step S2. However, when the operation enters Step S30 through the same loop, it is determined that the switching flag has been set, so that a determination is then made as to whether or not torque is 0, i.e., a current is flowing across the changeover circuit 9 (S32). It should be noted that the switching flag is reset upon completion of the changeover processing. The determination in Step S32 is made to determine whether a current is flowing prior to the switching of the transistors since it is dangerous to effect the switching of the transistors with a large current flowing across the changeover circuit 9. This determination is made on the basis of the torque value obtained in Step S3, but can also be made on the basis of the load current value fetched in Step S2. If the torque is not 0, the switching of the transistors cannot be effected, so that the operation returns. If the torque is 0, on the other hand, a determination is made as to whether or not the transistors have been operated by determining whether or not a transistor operating flag has been set (S33). This is to determine whether or not the on/off switching of the transistors is actually being effected for the switching of the power supplying mode. If the transistor operating flag has not been set, the operation of first-stage transistors is effected in Step S34. If the transistor operating flag has been set, a determination is made that the operation is being effected, and the processing branches to Step S35. The reason for this is as follows: Seven transistors are used in the changeover circuit 9 as shown in FIG. 2, and although these transistors need to be turned on or off to change over the power supply mode, i.e., the state of their energization need to be changed over, if all of these seven transistors are operated simultaneously, the battery unit of the battery 10 may be short-circuited. Hence, in this embodiment, the seven transistors are divided into two groups, and the on/off operation is effected in two stages. Thus, the operation of first-stage transistors, i.e., the operation of transistors of a first group, is commenced in Step S34, and the transistor operating flag indicating that the transistors are being operated, i.e., switching is being effected, is subsequently set (S48).

After the transistor operating flag is set in Step S48 and the processing returns, in the changeover processing routine concerned, it is confirmed in Step S33 that the transistor operating flag has been set. Accordingly, it is determined that the transistors are being operated, and it is then determined in Step S35 that a time t after the setting of the transistor operating flag has elapsed by a predetermined time t2 or more. This is a processing for determining whether or not the operation of the transistors has been completed. The time t2 is a value in which a time t1 required for the switching of the first-stage transistors and the time required for the switching of the second-stage transistors are totaled.

If it is determined in Step S33 that the time t2 has not elapsed after the setting of the transistor operating flag, the switching of all the transistors has not been completed. Hence, it is then determined in Step S36 whether or not the time t after the setting of the transistor operating flag has elapsed by the time t1 or more. This processing is effected to determine whether or not the switching of the first-stage transistors has been completed. If the time t1 required for the switching of the first-stage transistors or longer has elapsed after the setting of the transistor operating flag, it is determined that the switching of the first-stage transistors has been completed, so that the operation of the second-stage transistors is effected in Step S37. If the aforementioned time has not elapsed, it is determined that the first-stage transistors are presently being operated, so that the processing returns to resume the operation of the first-stage transistors. Namely, since the operation of the second-stage transistors be effected only after the completion of the operation of the first-stage transistors, the processing waits until the completion of the first-stage transistors.

If it is determined in Step S35 that the time t2 or more has elapsed after the setting of the transistor operating flag, it is determined in this case that all the operation of the first- and second-stage transistors has been completed and that the changeover processing has been completed. Hence, the switching flag is reset (S38), and the transistor operating flag is reset (S39), followed by a return.

After the switching in Step S6 is effected as described above, the operation returns to Step S2 and then enters Step 5 where NO is given as the result of determination since the switching has already been completed, so that recharging processing is effected in Step S7. During recharging processing, as shown in FIG. 4C, a determination is first made as to whether switching is presently being effected (S40). This processing is provided for the sake of reconfirmation to make assurance doubly assure. If it is determined that switching is being effected, a return is effected so as to resume the switching processing. If switching is not being effected, a determination is made in Step S41 as to whether or not the present power supply mode is the second power supply mode. Namely, since the power supply mode capable of effecting charging is only the second power supply mode, as shown in FIG. 3A, it is necessary to confirm whether or not the present power supply mode is the second power supply mode. This processing can be effected by the controller 1 by referring to information on the power supply modes which it possesses. If the present power supply mode is not the second power supply mode, the controller makes a switching request to the changeover circuit 9 so as to change over the power supply mode to the second power supply mode (S42). As a result, the changeover processing shown in FIG. 4B is executed (S43), whereby the on/off switching of the transistors is effected in the changeover circuit 9.

If the present power supply mode is the second power supply mode, the generator adjustment processing is effected (S44).

The generator adjustment processing is effected in accordance with the flow shown in FIG. 4D. A determination is first made as to whether or not regeneration is to be effected (S50). If YES is the answer, the controller 1 delivers a control signal to the clutch 7 via the control line 21, cuts off the generator 2, and sets the engine 3 in an idling state, followed by a return (S51). If regeneration is not to be effected, a determination is made as to whether or not switching is being effected (S52), and if YES is the answer, the current cannot be allowed to flow across the changeover circuit 9, so that the operation branches to Step S51 so as to set the engine 3 in the idling state. If switching is not being effected, the present power supply mode is detected through Steps S53–S56. Then, if the present power supply mode is the first or second power supply mode, the controller 1 delivers a control signal to the throttle 6 via the control line 20 and adjusts the speed of the engine 3 by adjusting the throttle opening so that the output current of the generator 2 will become a rated current or less, thereby adjusting the output current of the generator 2 (S57). If the power supply mode is the first or second power supply mode, the generator 2 and the battery 10 are connected in parallel, so that the output current of the generator 2 flows to the battery units of the battery 10. However, if the output current of the generator 2 exceeds the rated current, the possibility of the generator 2 breaking down becomes large, so that adjustment is made so that the output current becomes the rated level or less. In addition, if the power supply mode is the third or fourth power supply mode, when the output voltage of the generator 2 is large, a large current flows. Therefore, the controller 1 adjusts the output voltage to a predetermined fixed value by controlling the opening of the throttle 6.

The above is the overall flow of the generator adjustment processing, and in the generator adjustment processing in the charging processing in Step S7 in FIG. 4A, regeneration is being effected, so that the engine 3 is set in the idling state.

Upon completion of the generator adjustment processing in Step S44, the operation of the transistors is effected in Step S45 and charging is commenced.

Figure 5:
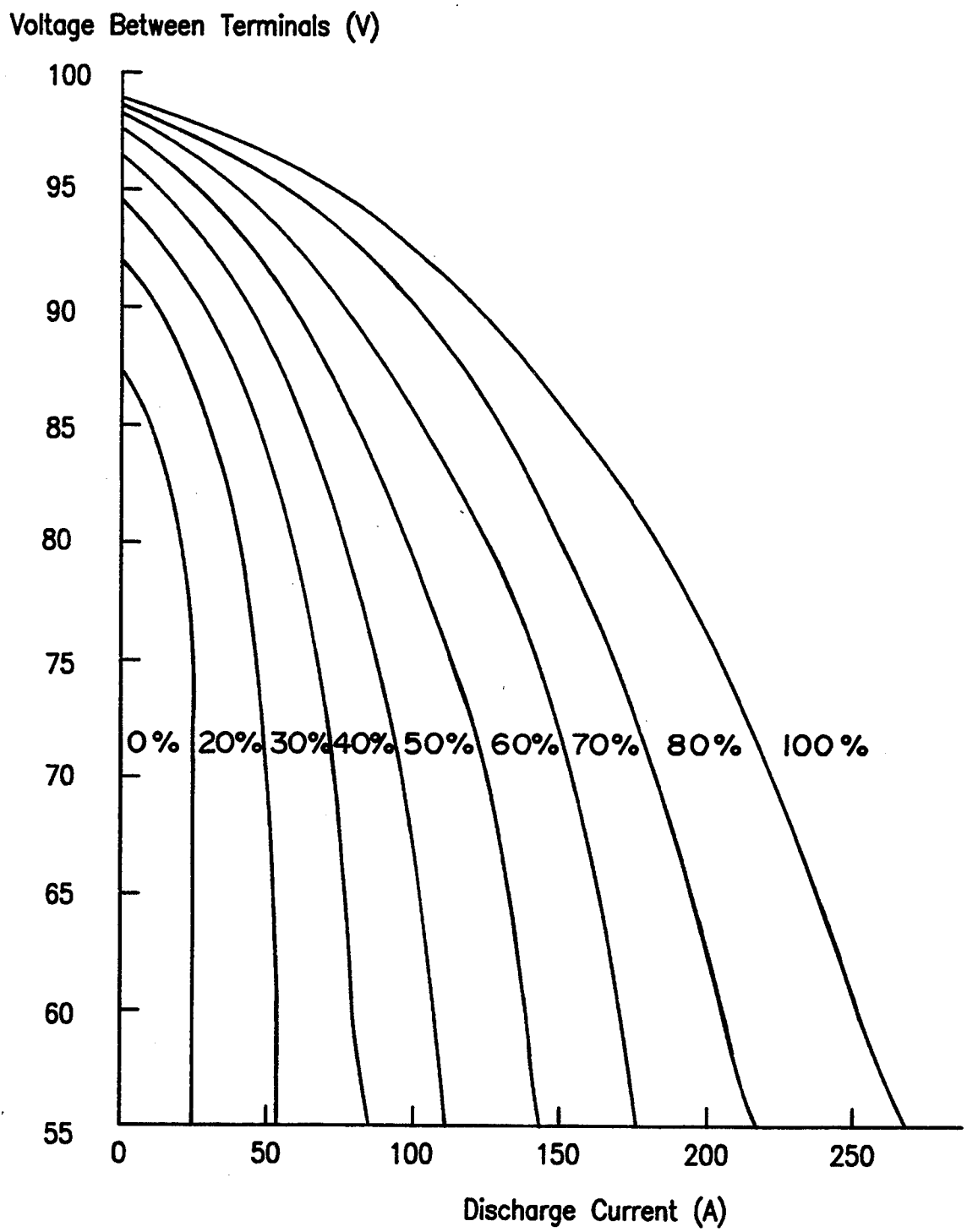
FIG. 5 is a diagram illustrating an example of a map for determining a remaining amount of the battery.

The above is the processing of charging which is effected when it is determined in Step S4 that regeneration is to be effected. If it is determined in Step S4 that regeneration is not to be effected, the controller 1 determines whether or not the remaining amount of the battery is 70% or less (S8). This determination is made to recharge the battery 10 when the remaining amount of the battery is 70% or less. Although in this embodiment the threshold is set at 70%, it is evident that the threshold may be an arbitrary value. Various methods are known as methods of determining the remaining amount of the battery, an any method may be adopted. In this embodiment, it is assumed that the map shown in FIG. 5 is used. FIG. 5 shows a map in which the remaining amount of the battery is determined with respect to a voltage between terminals of a battery unit in which eight 12V batteries are connected in series and a discharge current thereof. For instance, it can be seen that in a case where the voltage between the terminals is 75 V and the discharge current 200 A, the remaining amount of the battery is 80%. This map is stored in the ROM in the controller 1, so that the controller 1 is capable of determining the remaining amount of the battery from the voltage between the terminals of the battery unit and the discharge current both fetched in Step S2 by referring to the map. It should be noted that in a case where a plurality of battery units are used as shown in FIG. 1B, an arrangement is provided such that the remaining amount of the battery is determined for each battery unit, and the remaining amount of the battery 10 is determined from an arithmetic mean value of the remaining amounts of these battery units. Accordingly, the controller 1 determines the remaining amounts of the two battery units, then determines an arithmetic mean value of the remaining amount of the battery from those remaining amounts of the battery units, and effects the processing of Step S8 by comparing the arithmetic mean value with 70%, i.e., the threshold.

If the remaining amount of the battery is 70% or less, a determination is made as to whether or not torque $\tau$ is not more than a predetermined value $\alpha$ (S9), and if the torque $\tau$ is not more than the predetermined value $\alpha$, the charging processing shown in FIG. 4C is executed (S10). It should be noted that the determination in Step S9 may be made by determining whether or not an accelerator opening $\theta$ is not more than a predetermined value $\beta$. The reason for this is that the torque can be determined on the basis of the accelerator opening, as described before.

If the remaining amount of the battery is a value exceeding 70% in Step S8, or if the current of the generator is not 0 even if the remaining amount of the battery is 70% or less, or if the charging processing in Step S10 is completed, then the generator adjustment processing shown in FIG. 4D is executed (S11), and a current estimation is then executed (S12).

Figure 6:
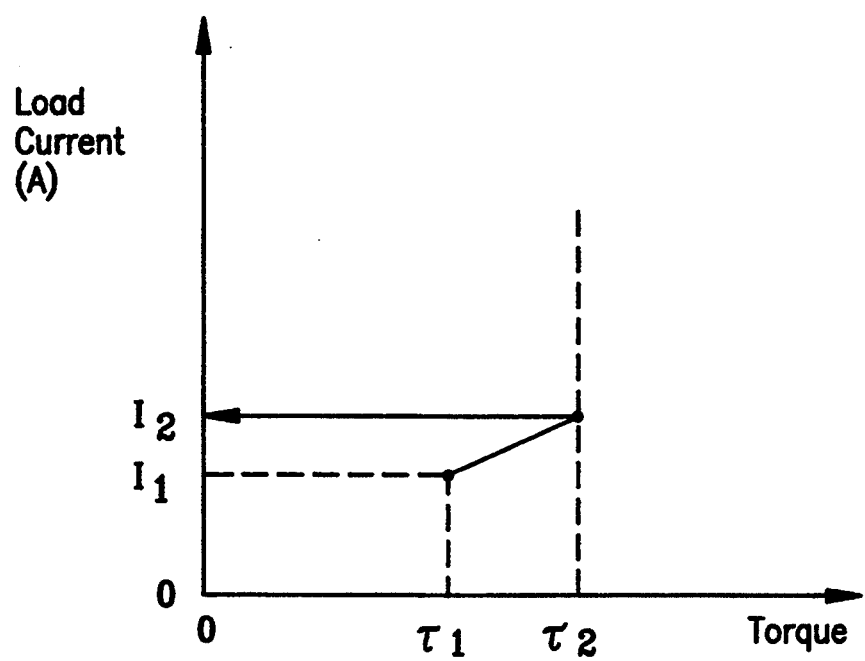
FIG. 6 is a diagram illustrating current estimation processing.

The current estimation processing is a preprocessing for determining which of the power supply modes is optimum as the power supply mode. In this processing, a calculation is made as to how much current is to be supplied to the motor controlling circuit 11 so as to generate the torque determined in Step S3. This processing may be effected as follows: In other words, although the routine shown in FIG. 4A is started for each predetermined time, e.g., for each 5 msec, the value of torque determined in the previous routine, as well as the vehicle speed and the load current at that time, are stored in advance in the RAM of the controller 1, and the value of the current to be supplied this time to the motor controlling circuit 11 is estimated on the basis of these values stored and the torque value determined in Step S3 in the present routine. For instance, as shown in FIG. 6, if it is assumed that in the previous routine the torque was $\tau 1$, the vehicle speed was v1, and the load current was I1, and that the torque determined in Step S3 in the present routine is $\tau 2$, since it can be assumed that the vehicle speed is not changed in 5 msec, so that if the vehicle speed v1 is assumed to be fixed, a load current I2 at the torque $\tau 2$ can be determined. In addition, as another method, an arrangement may be provided such that the previous and present torque and load current values are stored in advance, the relationship between the torque and the load current is approximated by a straight line on the basis of those values, and the load current is estimated from the present torque value by using the straight line. It should be noted that the load current is 0 when the routine of FIG. 4A is initially commenced, so that the load current which is estimated to continue as it is is 0. Hence, when that routine is initially commenced, a predetermined load current value is provisionally set.

When the load current is estimated as described above, a determination is then made as to whether or not switching is being effected (S13). If YES is the answer, switching is continued in Step S14, and if NO is the answer, one of power supply mode maps is referred to on the basis of an estimated load current value so as to determine a power supply mode suited for supplying the estimated load current.

The power supply mode maps are stored in advance in the ROM in the controller 1, and and the power supply modes are set in correspondence with the vehicle speed and load current values and in response to the remaining amount of the battery, as shown in FIGS. 7A–7F. In the drawings, ①, ②, ③, and ④ respectively indicate the first, second, third, and fourth power supply modes. For instance, in a case where the remaining amount of the battery is 70–80%, by referring to the map shown in FIG. 7E, the second power supply mode is adopted if the vehicle speed is 50 km/h and the load current is 100 A, while the third power supply mode is adopted if the vehicle speed is 100 km/h and the load current is 30 A. It should be noted that the solid lines and broken lines in the maps indicate that hysteresis is provided in determining the power supply mode. The solid line is adopted when the load current tends to increase and the vehicle speed tends to increase, while the broken line is adopted when the load current tends to decrease and the vehicle speed tends to decrease. For instance, in the map shown in FIG. 7E, a changeover from the fourth to the second power supply mode falls in a case where the load current tends to increase, so that the changeover is effected when the load current exceeds 50 A. A changeover from the second to the fourth power supply mode falls in a case where the load current tends to decrease, so that the changeover is effected when the load current drops below 40 A. A changeover from the second to the first power supply mode takes place in a similar manner, and if the load current tends to increase, the changeover is effected when the load current exceeds 130 A. A changeover from the first to the second power supply mode falls in the case where the load current tends to decrease, so that the changeover is effected when the load current drops below 120 A. In addition, a changeover from the fourth to the third power supply mode, which falls in the case where the vehicle speed tends to increase, is effected when the vehicle speed exceeds 80 km/h. A changeover from the third to the fourth power supply mode, which falls in the case where the vehicle speed tends to decrease, is effected when the vehicle speed falls below 70 km/h. The same holds true of the other maps. Incidentally, which of the maps of FIGS. 7A to 7F is to be used is determined by the remaining amount of the battery, and the value obtained in Step S8 is used as the remaining amount of the battery.

Figure 7A:
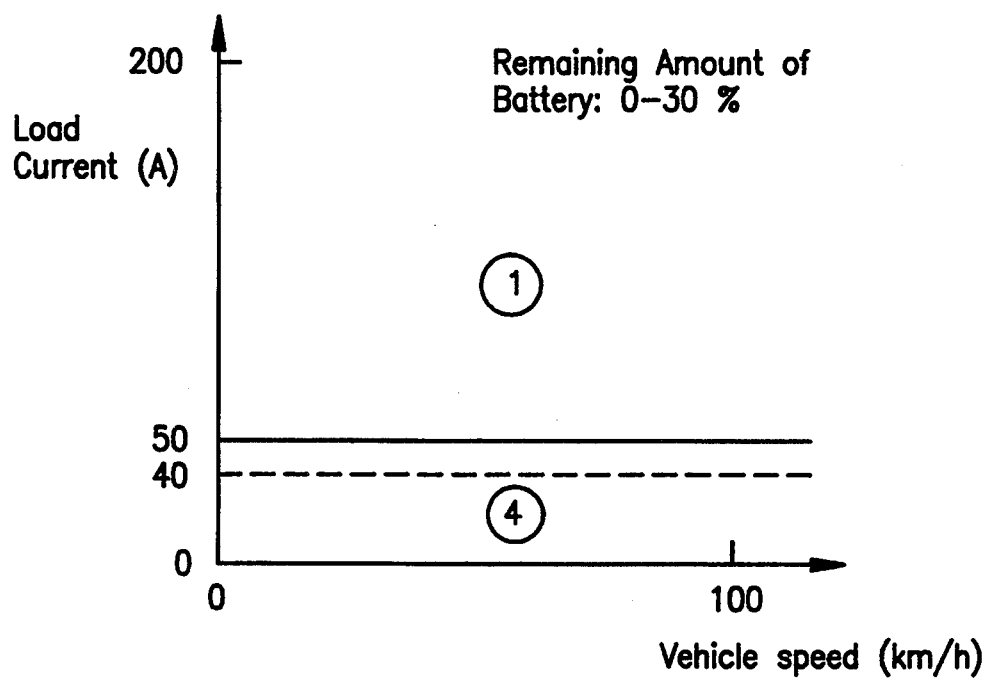
FIGS. 7A to 7F are diagrams illustrating examples of a map for determining a power supplying mode.
Figure 7B:
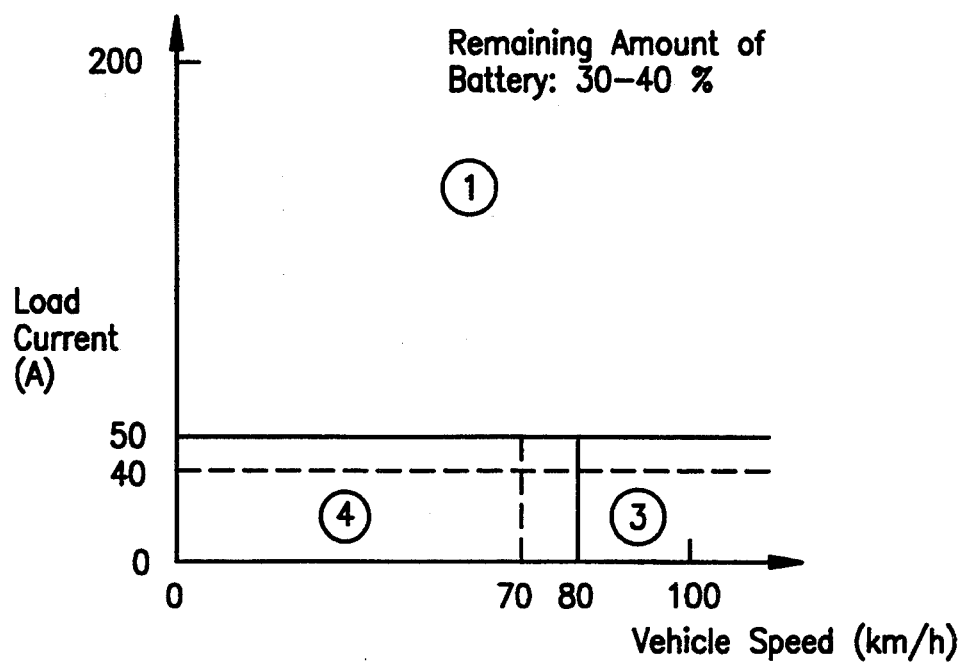
Figure 7C:
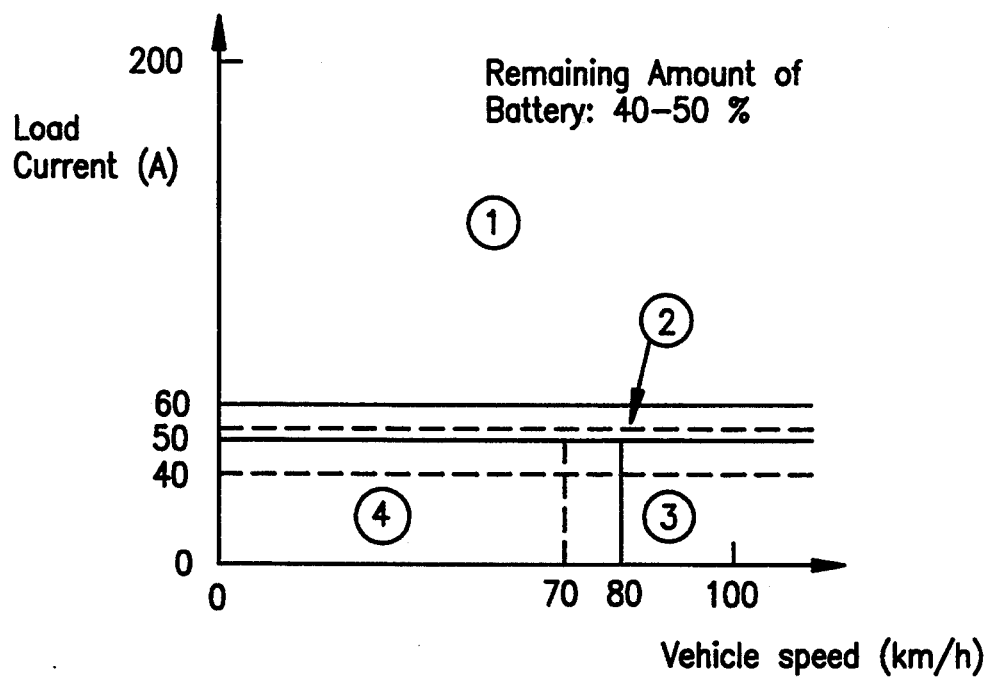
Figure 7D:
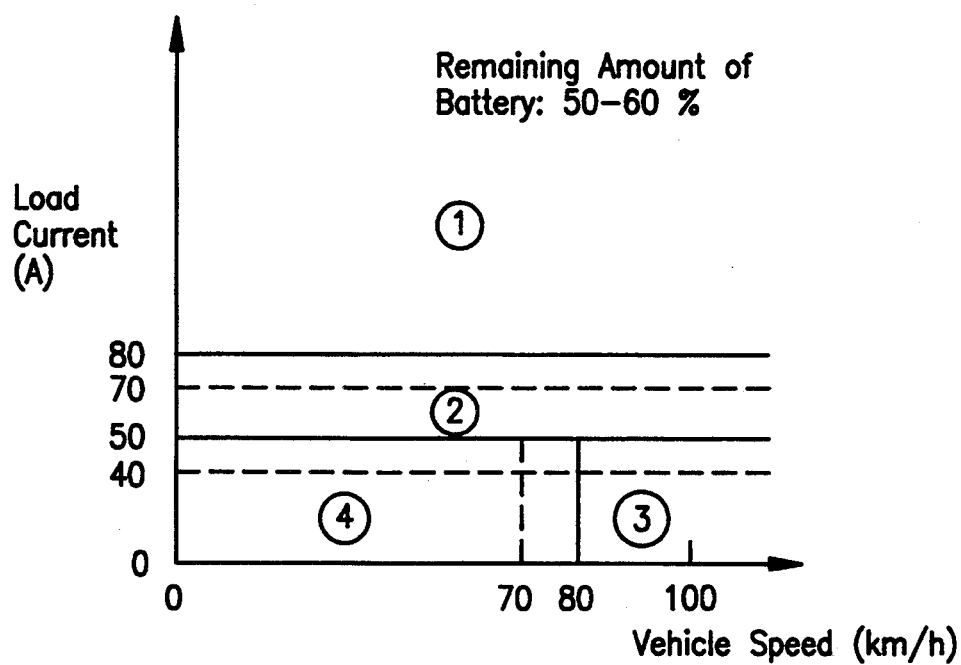
Figure 7E:
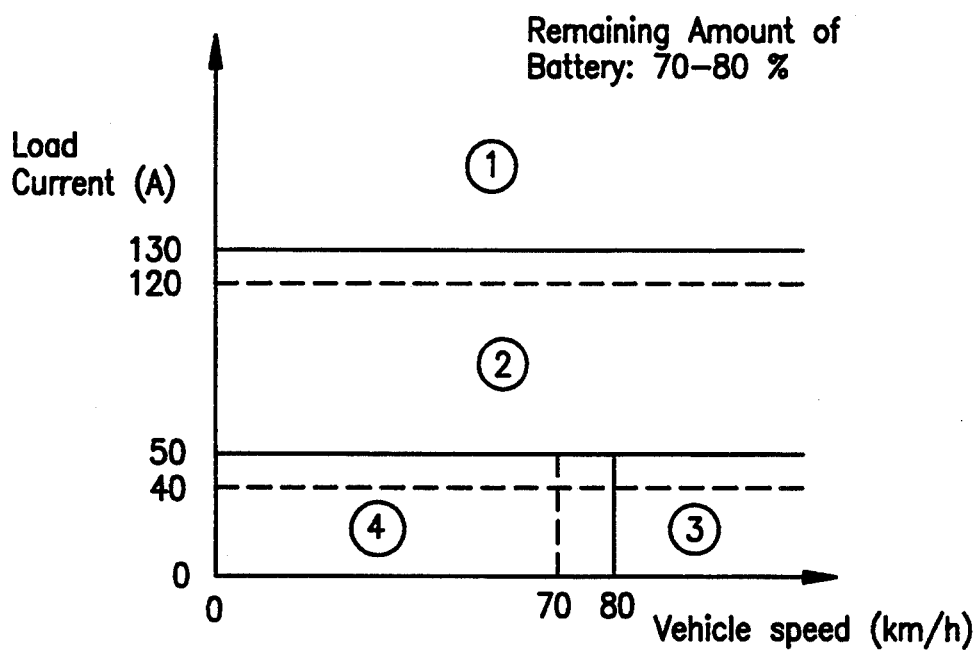
Figure 7F:
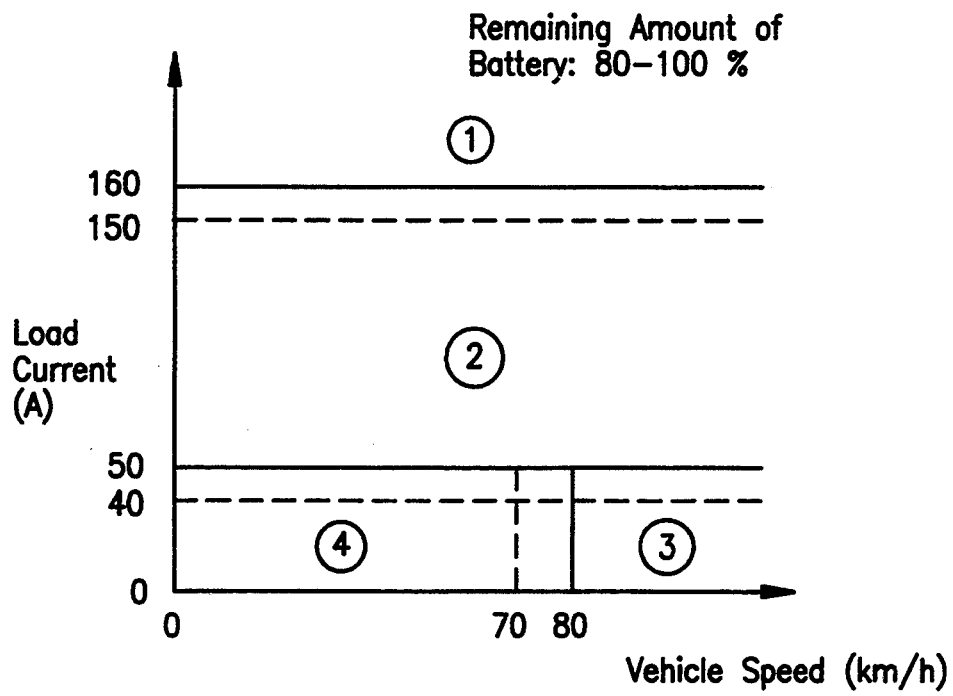
Figure 8A:
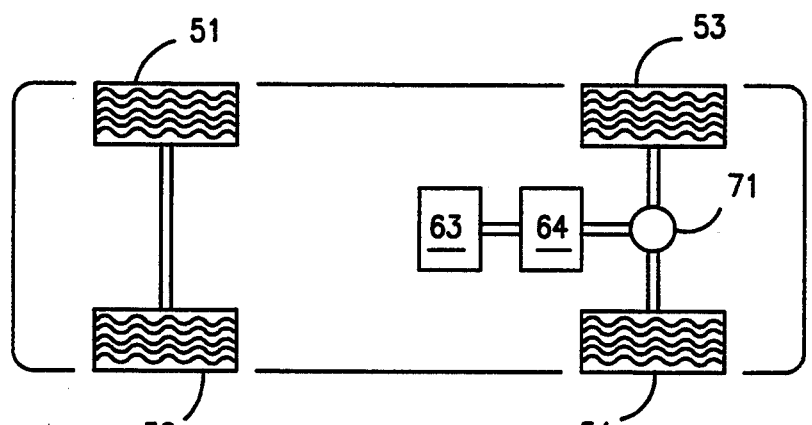
FIGS. 8A-8C are diagrams illustrating examples of conventional electric motor vehicles and their electric power units.
Figure 8B:
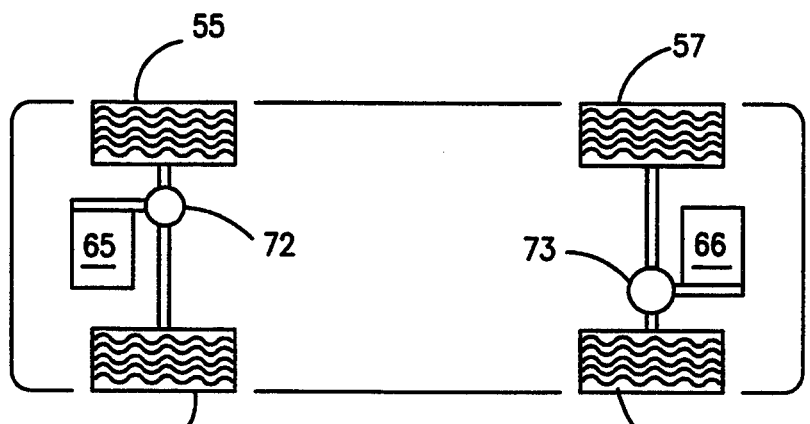
Figure 8C:
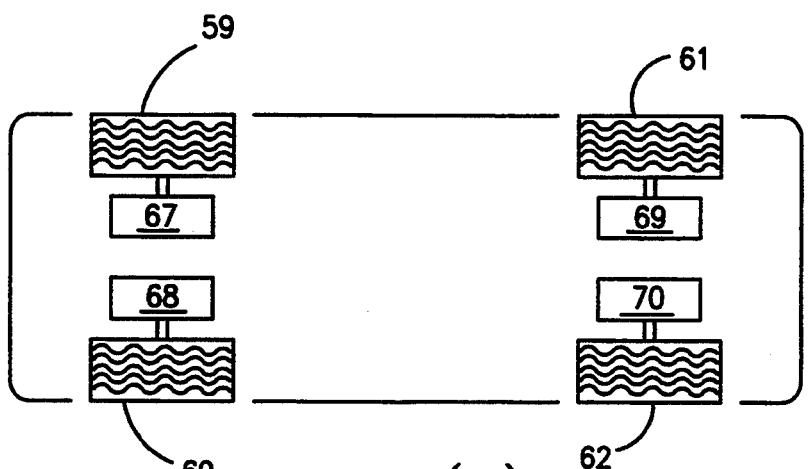

In the map of FIG. 7A used when the remaining amount of battery is 0–30%, the changeover from the fourth to the first power supply mode is effected when the load current rises above 50 A, and the changeover from the first to the fourth power supply mode is effected when the load current falls below 40 A. In the map of FIG. 7B used when the remaining amount of battery is 30–40%, the changeover from the fourth to the first power supply mode is effected when the load current rises above 50 A, the changeover from the first to the fourth power supply mode is effected when the load current falls below 40 A, the changeover from the fourth to the third power supply mode is effected when the vehicle speed rises above 80 km/h, and the changeover from the third to the fourth power supply mode is effected when the vehicle speed falls below 70 km/h. In the map of FIG. 7C used when the remaining amount of battery is 40–50%, the changeover from the fourth to the second power supply mode is effected when the load current rises above 50 A, the changeover from the second to the fourth power supply mode is effected when the load current falls below 40 A, the changeover from the second to the first power supply mode is effected when the load current rises above 60 A, the changeover from the first power supply mode to the second power supply mode is effected when the load current falls below 50 A, the changeover from the fourth to the third power supply mode is effected when the vehicle speed rises above 80 km/h, and the changeover from the third to the fourth power supply mode is effected when the vehicle speed falls below 70 km/h. In the map of FIG. 7D used when the remaining amount of battery is 50–60%, the changeover from the fourth to the second power supply mode is effected when the load current rises above 50 A, the changeover from the second to the fourth power supply mode is effected when the load current falls below 40 A, the changeover from the second to the first power supply mode is effected when the load current rises above 80 A, the changeover from the first power supply mode to the second power supply mode is effected when the load current falls below 70 A, the changeover from the fourth to the third power supply mode is effected when the vehicle speed rises above 80 km/h, and the changeover from the third to the fourth power supply mode is effected when the vehicle speed falls below 70 km/h. In the map of FIG. 7F used when the remaining amount of battery is 80–100%, the changeover from the fourth to the second power supply mode is effected when the load current rises above 50 A, the changeover from the second to the fourth power supply mode is effected when the load current falls below 40 A, the changeover from the second to the first power supply mode is effected when the load current rises above 160 A, the changeover from the first power supply mode to the second power supply mode is effected when the load current falls below 150 A, the changeover from the fourth to the third power supply mode is effected when the vehicle speed rises above 80 km/h, and the changeover from the third to the fourth power supply mode is effected when the vehicle speed falls below 70 km/h.

Now, when a first proposed power supply mode is determined in Step S15 on the basis of the estimated load current and the actual vehicle speed fetched in Step S2, the controller 1 then determines second proposed power supply mode by referring to one of the power supply mode maps by using the actually measured load current value, the load current value fetched in Step S2, and the vehicle speed (S16). Then, the controller 1 compares these two power supply modes (S17), and if they are the same, a determination is made in Step S18 as to whether the power supply mode thus determined is the same as the present power supply mode. If they are the same, there is no need to change the power supply mode, so that the operation branches to Step S25. However, if the power supply mode determined is not the same as the present power supply mode, the controller 1 in step S19 makes a request for switching the power supply mode to the power supply mode determined in Step S16, and effects the changeover processing shown in FIG. 4B (S20).

If the power supply mode determined in Step S15 differs from the power supply mode determined in Step S16, a comparison is made between the magnitude of the estimated load current and that of the actually measured load current (S21). If the estimated load current is greater, a determination is made as to whether or not the power supply mode determined in Step S15 is the same as the present power supply mode (S22). If they are the same, the operation branches to Step S25, and if they are different, the controller 1 in step S23 makes a request for switching the power supply mode to the one determined from the estimation map, i.e., in Step S15, and executes the changeover processing shown in FIG. 4B (S24). In addition, if it is determined in Step S21 that the actually measured load current value is greater, the operation branches to Step S18 to effect the above-described processing, whereupon the power supply mode determined in Step S16 is set.

In short, the foregoing processing effected in Steps 17–S24 is effected as an attempt to select a power supply mode suited to a greater current value between the estimated load current and the actually measured load current. Since a power supply mode capable of withstanding a large current can hence be adopted, no failure occurs even when the large current flows.

After a desired power supply mode is selected as described above, the controller 1 stores the torque, the load current, and the vehicle speed in the RAM (S25). These data are used at the time of effecting the torque calculation processing in Step S3, the current estimation processing in Step S12, and so on which are effected in the routine to be conducted next time. It should be noted that the torque value stored at this stage is a value determined in Step S3, the vehicle speed is a value fetched in Step S2, and the load current is an actually measured load current.

Subsequently, the controller 1 determines whether or not switching is being effected (S26), and if switching is being effected, there is a need to set the load current to 0, the controller 1 gives a command to the motor controlling circuit 11 to set the torque to 0 (S27). If switching is not being effected, the controller 1 imparts the torque value obtained in Step S3 to the motor controlling circuit 11 (S28). As a result, the state of energization of the switching elements constituting the motor controlling circuit 11 is changed over, and the designated current is supplied to the motor 12.

Upon completion of the processing in Step S27 or S28, the controller 1 repeats the processing of Step S2 onwards, and the above-described processing is repeated for each predetermined time, e.g., for each 5 msec.

As is apparent from the foregoing description, in accordance with the present invention, in an electric motor vehicle in which a hybrid power source having a generator and a battery is mounted, the state of connection between the generator and the battery is switched over, as necessary, into parallel or series connection. Accordingly, it is possible to adopt a power supply mode optimally suited to the running condition persisting on each occasion, so that it is possible to compensate for the drawbacks of the generator and the battery and make effective use of them. Therefore, it is possible to meet various running conditions, including long-distance running, short-distance running, high-speed running, low-speed running, high-torque running, and low-power running.

Although a description has been given of embodiments of the present invention, the present invention is not restricted to those embodiments, and various modifications are possible. For instance, the power source of the generator may not be the gasoline engine, or a fuel cell or the like may be used instead of the battery 10. Furthermore, although in the foregoing embodiments the battery 10 has been described as comprising two battery units, it is evident that another arrangement may be adopted. Moreover, the configuration of the changeover circuit 9 has been described by way of illustration, and a different configuration may be adopted. The power supply modes are not confined to the above-described four types, and a different arrangement may be provided. Additionally, the method of calculating torque and the method of determining the remaining amount of the battery are not restricted to those of the above-described embodiments, and conventionally known methods may be adopted.

What is claimed is:

1. A system of changing over an electric power source for an electric motor vehicle including a battery unit and a generator, comprising:
   a changeover circuit for changing over a state of connection between said battery unit and said generator including a parallel connection state where said battery unit and said generator are connected in parallel and a series connection state where said battery unit and said generator are connected in series;
   means for determining a speed of the vehicle;
   means for measuring a current value of an electric motor of said vehicle;
   a controller for determining a power supply mode, said controller being adapted to instruct a changeover of the state of connection to said changeover circuit based upon said determined power supply mode, wherein said controller estimates a current value of said electric motor, determines a first proposed power supply mode on the basis of said vehicle speed and said estimated current value and a second proposed power supply mode on the basis of said vehicle speed and said measured current value, compares said estimated current value and said measured current value, and selects the determined power supply mode from said first and second proposed power supply modes in accordance with the comparison, said determining of the first proposed power supply mode including defining the first proposed power supply mode as being the parallel connection state when the estimated current value is larger than a predetermined value and defining the first proposed power supply mode as being the series connection state when the estimated current value is less than the predetermined value, said determining of the second proposed power supply mode including defining the second proposed power supply mode as being the parallel connection state when the measured current value is larger than the predetermined value and defining the second proposed power supply mode as being the series connection state when the measured current value is less than the predetermined value.

2. A system of changing over an electric power source for an electric motor vehicle according to claim 1, wherein said controller selects the first proposed power supply mode as said determined power supply mode when said estimated current value is greater than said measured current value and selects the second proposed power supply mode as said determined power supply mode when said measured current value is greater than said estimated current value.

3. A system of changing over an electric power source for an electric motor vehicle according to claim 1, wherein said controller determines said estimated current value from a previous torque value of the electric motor, a previous measured current value of the electric motor and a present torque value of the electric motor.

4. A system of changing over an electric power source for an electric motor vehicle according to claim 1, wherein said changeover circuit includes transistors for changing over a state of connection between said battery and said generator, and said controller instructs the changeover of the state of connection according to whether or not a current is flowing in said changeover circuit.

5. A system of changing over an electric power source for an electric motor vehicle according to claim 1, wherein the controller adjusts the output current of the generator to maintain the generator current equal to or less than a predetermined level.

* * * * *

UNITED STATES PATENT AND TRADEMARK OFFICE
CERTIFICATE OF CORRECTION

PATENT NO.   : 5,389,825
DATED        : February 14, 1995
INVENTOR(S)  : ISHIKAWA et al It is certified that error appears in the above-indentified patent and that said Letters Patent is hereby corrected as shown below:

Col. 1, line 29, delete "device using" insert --including--.

Col. 3, line 67, delete "DC".

Col. 5, line 56, "dc" should read --DC--.

Col. 6, line 44, "then-made" should read --then made--.

Col. 10, line 25, after "value" insert --in step S15--.

Col. 12, line 4, after "determines" insert --a--; and line 31, delete "in step S23".

Signed and Sealed this

Twelfth Day of September, 1995

Attest:

BRUCE LEHMAN

*Attesting Officer*   *Commissioner of Patents and Trademarks*